Figure 1:
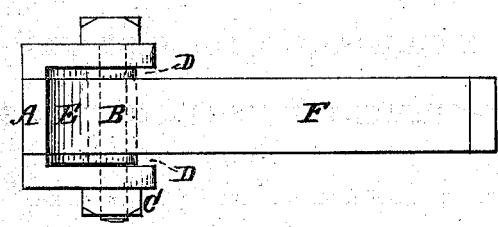

*Jonathan Childs', Improved Shaft-coupling for Carriages.*

No. 119,446. Patented Oct. 3, 1871.

Witnesses:
G. Wilson
F. B. Durant

Inventor:
Jonathan Childs

119,446

UNITED STATES PATENT OFFICE.

JONATHAN CHILDS, OF WEST TROY, NEW YORK.

IMPROVEMENT IN THILL-COUPLINGS.

Specification forming part of Letters Patent No. 119,446, dated October 3, 1871.

*To all whom it may concern:*

Be it known that I, JONATHAN CHILDS, of West Troy, county of Albany, and State of New York, have invented certain Improvements in Shaft-Coupling for Carriages, of which the following is a specification:

The object of my invention is to attach and detach the pole or shafts from a carriage instantly, dispensing with use of straps, bolts, or nuts in the connection, and also to prevent noise or rattling of the shafts or disengagement of the same from the carriage while at work. The nature of my invention consists in mounting the ends of the shafts at their connection with the carriage or clips with a peculiarly-constructed metallic plate-hook, which is composed of two eccentric circles. the outer circle, forming the outer contour of the hook, being intended to crowd or lock against the clip when the shaft is raised to the working angle, whereby the shaft and the clip work steadily, and cannot be disengaged until the shafts assume the opposite angle or are laid on the ground, when they are easily removed, while the inner circle, which is drilled out, forming the inner surface of the hook, embraces the clip-bolt and its India-rubber packing, securing the connection of the hook, with the clip-bolt, against rattling or noise, and presenting a shoulder which prevents disengagement of the hook from the clip-bolt when the shaft assumes a right angle to the clip, as I will further explain by reference to the drawing, in which—

Figure 2:
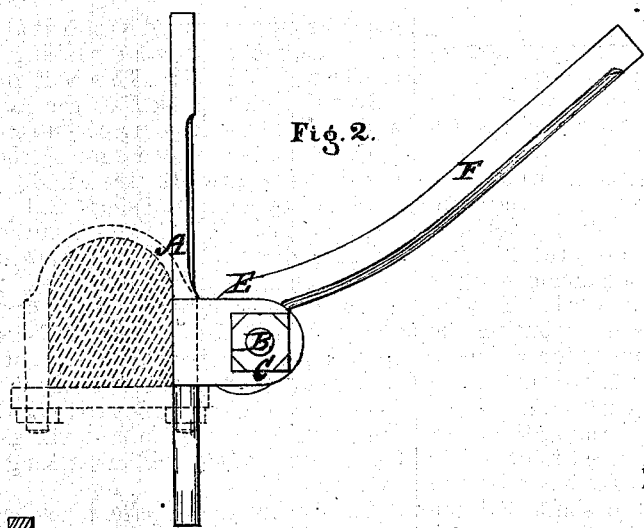
Figure 3:
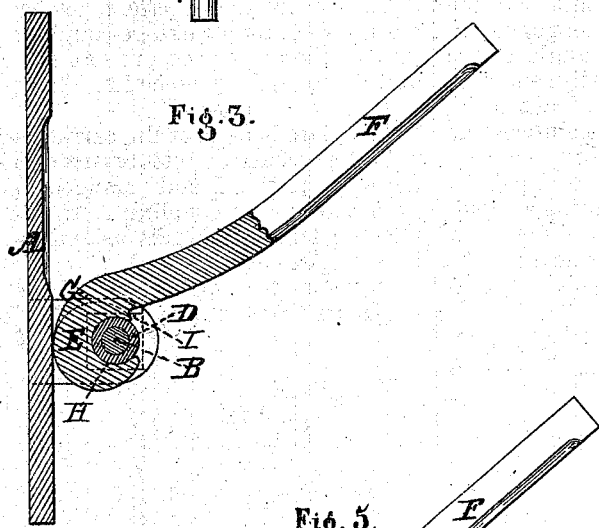
Figure 4:
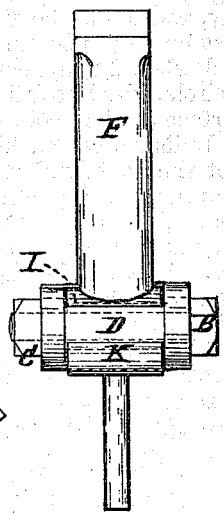
Figure 5:

Figure 1 is a top view of shaft and carriage-clip connection; Fig. 2, a side elevation; Fig. 3, a vertical section; Fig. 4, a front view; and Fig. 5, a view of hook removed from the carriage-clip.

In the said drawing, A indicates a portion of a carriage-clip, provided with bolt and nut B C and an India-rubber tubular packing, D, which encircles the said bolt. This bolt and packing receives the plate-hook E of the carriage-shaft F, and its contour G being eccentric with the bolt B the hook is crowded against the clip A when the shafts are at work, (see Fig. 3,) making steady work between clip and shaft, and preventing disengagement. H is the inner surface of the hook, which embraces the rubber packing D and bolt B, preventing rattling or noise of the shaft; and I is a shoulder or projection, between which and the extremity K of the hook there is a line less than the diameter of the interior of the hook, disengagement being effected only when the shafts assume an angle opposite to that when the shafts are at work or when laid on the ground, and by compression of the rubber packing D to a certain extent.

I am aware that a patent has been granted to one Gardner for a carriage-coupling, in which the jaws of the plate-hook are straight and parallel, and to which I lay no claim.

What I claim is—

The plate-hook E of the carriage-shaft, formed with the eccentric circles or curves G H and shoulder or projection I, and arranged in combination with the clip or coupling A and its bolt B and packing D, substantially as and for the purpose herein specified.

In testimony whereof I have hereunto set my signature this 15th day of July, 1871.

JONATHAN CHILDS.

Witnesses:
G. B. WILSON,
F. B. DURANT.

(22)